United States Patent
Kushida

(10) Patent No.: US 7,548,686 B2
(45) Date of Patent: Jun. 16, 2009

(54) IMAGE-CAPTURING APPARATUS AND DRIVING METHOD OF OPTICAL SYSTEM

(75) Inventor: Hidenori Kushida, Tokyo (JP)

(73) Assignee: Sony Corporation (JP)

( * ) Notice: Subject to any disclaimer, the term of this patent is extended or adjusted under 35 U.S.C. 154(b) by 430 days.

(21) Appl. No.: 11/201,415

(22) Filed: Aug. 11, 2005

(65) Prior Publication Data

US 2006/0045508 A1    Mar. 2, 2006

(30) Foreign Application Priority Data

Aug. 30, 2004    (JP) ............................ P2004-250732

(51) Int. Cl.
*G03B 3/00* (2006.01)

(52) U.S. Cl. ...................... 396/102; 396/103; 348/240.2

(58) Field of Classification Search ................. 396/102, 396/76, 103, 131; 348/240.2, 240.3
See application file for complete search history.

(56) References Cited

U.S. PATENT DOCUMENTS

| | | | | |
|---|---|---|---|---|
| 4,157,217 A | * | 6/1979 | Isono .......................... | 396/102 |
| 4,344,679 A | * | 8/1982 | Yagi et al. ...................... | 396/93 |
| 4,470,683 A | * | 9/1984 | Nakajima ...................... | 396/102 |
| 4,561,746 A | * | 12/1985 | Matsuda et al. ............... | 396/102 |
| 4,575,212 A | * | 3/1986 | Kitaura et al. ................ | 396/102 |
| 4,825,238 A | * | 4/1989 | Akashi ......................... | 396/102 |
| 5,249,058 A | | 9/1993 | Murata et al. | |
| 5,844,726 A | * | 12/1998 | Masuda ........................ | 359/697 |
| 2003/0063212 A1 | | 4/2003 | Watanabe et al. | |
| 2003/0197803 A1 | | 10/2003 | Watanabe et al. | |

FOREIGN PATENT DOCUMENTS

| | | |
|---|---|---|
| EP | 0 279 423 A2 | 8/1988 |
| EP | 0279423 A * | 8/1988 |
| JP | 59-216111 | 12/1984 |
| JP | 63-177118 | 7/1988 |
| JP | 08-313793 | 11/1996 |
| JP | 10-274737 | 10/1998 |
| JP | 11-023943 | 1/1999 |
| JP | 11-023956 | 1/1999 |
| JP | 11-248997 | 9/1999 |
| JP | 2000-111783 | 4/2000 |
| JP | 2003-107318 | 4/2003 |
| JP | 2004-021090 | 1/2004 |

OTHER PUBLICATIONS

European Search Report mailed on Jul. 11, 2006.
Japanese Office Action issued on Jul. 22, 2008 for corresponding Japanese Application No. 2004-250732.

* cited by examiner

*Primary Examiner*—Patrick J Assouad
*Assistant Examiner*—Michael A Strieb
(74) *Attorney, Agent, or Firm*—Rader Fishman & Grauer PLLC; Ronald P. Kananen

(57) ABSTRACT

An image-capturing apparatus for controlling a drive system for an optical system corresponding to the position of an operation unit includes a motor for driving a control target of the drive system, a driver for the motor, position detecting means for detecting the position of the operation unit, position generating means for generating the output corresponding to the position of the operating unit with a limited movable range by configuring an initialization value and maximum and minimum values of integrated displacement by the output of the position detecting means, and controlling means for controlling the motor via the driver so as to drive the control target corresponding to the position generating output of the operating unit.

26 Claims, 6 Drawing Sheets

MR ENCODER

IMAGE-CAPTURING APPARATUS AND DRIVING METHOD OF OPTICAL SYSTEM

CROSS REFERENCES TO RELATED APPLICATIONS

The present invention contains subject matter related to Japanese Patent Application JP 2004-250732 filed in the Japanese Patent Office on Aug. 30, 2004, the entire contents of which are incorporated herein by reference.

BACKGROUND OF THE INVENTION

1. Field of the Invention

The present invention relates to an image-capturing apparatus that controls a lens drive system during image capturing, and a driving method of an optical system.

2. Description of the Related Art

Recently, an open-loop control system using a stepping motor as an actuator has been widely used in camera drive systems. Such a control mechanism has an enhanced positioning resolution, achieving positional accuracies on the order of a few µm.

When a lens is moved with a motor in this camera drive system, a method has been known in that an operation controller detects a state of an operation member and the motor is controlled corresponding to the state and an integrated value of the state. For example, there have been provided a lever ring in that the operation member returns to the midpoint (see Japanese Unexamined Patent Application Publication No. 59-216111) and a rotary ring operation member (see Japanese Unexamined Patent Application Publication No. 63-177118). In order to have high accuracy in lens positional control and high resolution in operation, a ring has been required for controlling by such an operation controller.

On the other hand, in a lens mechanism in that a ring is mechanically connected to a lens and the lens advances or retreats in a lens barrel (mainly used for business purposes), the rotational angle of the ring is limited corresponding to the maximum advanced position or the maximum retracted position of the lens, and because the rotational angle of the ring is brought into one-to-one correspondence with the lens position, it is easy to intuitively operate this mechanism.

An example of a preexisting lens position determining method requiring the positional detection with high resolution similarly to the operation ring includes the following methods: a first is a method for obtaining an absolute position using a hall sensor and a potentiometer; a second is a method for obtaining a relative position from a reference position by combining a reset sensor with an MR (magneto resistance effect) sensor using the reset sensor for detecting the reference position and an FG (frequency generator) pulse counter (see Japanese Unexamined Patent Application Publication No. 59-216111); and a third is a method for detecting a plurality of reference positions using two or three reset sensors.

SUMMARY OF THE INVENTION

When the above-mentioned lens mechanism in that the ring is mechanically connected to the lens is applied to an inner focus lens, because of a complicated configuration, a ring movable range may not be brought into one-to-one correspondence with a lens movable range, so it has been difficult to intuitively comprehend when a control target (inner focus lens) arrives at a movable end.

In the relative position sensing for detecting the rotation magnitude of the operating ring with a displacement sensor, such as a two-phase pulse encoder, shown in the second method for obtaining the lens position, if the rotational angle of the operating ring is limited, there is a problem that the ring position cannot be comprehended directly after activation. Hence, for detecting the relative displacement using the state of the sensor directly after the activation as a reference, the ring is in a state capable of infinitely rotating. Thus, the ring movable range may not be brought into one-to-one correspondence with the lens movable range, so it has been difficult to intuitively comprehend when a control target (lens, for example) arrives at the movable end.

It may be possible for the configuration to detect the rotation magnitude of the operating ring by the output of the absolute position sensor, such as the potentiometer, shown in the first method for obtaining the lens position; however, the absolute position sensor generally has restrictions, such as low resolution and susceptibleness to noise, so the first method has been unsuitable for moving the lens smoothly or finely.

In the case where a plurality of the reset sensors are used shown in the third method for obtaining the lens position, the resolution has been reduced due to mechanical restrictions, such as the arrangement of the plurality of the reset sensors.

It is desirable to provide an image-capturing apparatus and a driving method of an optical system, which are capable of smoothly driving a control target by easily comprehending the arrival of the control target at the movable end.

According to an embodiment of the present invention, there is provided an image-capturing apparatus including a motor for driving a control target of the drive system; a driver for the motor; relative position detecting means for detecting the position of the operation unit; position generating means for generating the output corresponding to the position of the operating unit with a limited movable range by configuring an initialization value and maximum and minimum values of integrated displacement by the output of the position detecting means; and controlling means for controlling the motor via the driver so as to drive the control target corresponding to the generated position output of the operating unit.

Thereby, in the operating unit with a physically limited rotational angle (movable range), by configuring an initialization value and maximum and minimum values of integrated displacement of the position detecting means, the movable end of the operating unit is allowed to agree with the movable end of the control target.

The value of a storage area storing the position generating output in the position generating means herein is assumed to be an initialization value from the position detecting means, and after the initialization , the value of the storage area is integrated based on the signal from the position detecting means.

Furthermore, on the basis of the value of the storage area in the position generating means, when the integrated value is detected to be smaller or larger than the limited movable range of the operation unit, the minimum value or the maximum value of the integrated output is renewed corresponding to the movable range.

Thereby, positions of members of the optical system in the image-capturing apparatus, such as the zoom lens, the focus lens, and the iris, are controlled.

According to the embodiment of the present invention, there is provided a driving method for driving an optical system including the steps of detecting the position of the operation unit; generating the output corresponding to the position of the operating unit with a limited movable range by configuring an initialization value and maximum and minimum values of integrated displacement by the output of the detecting position step; controlling a motor via a driver so as to drive a control target corresponding to the generated position output of the operating unit; and driving the control target of the drive system with the motor.

Thereby, in the operating unit with a physically limited rotational angle (movable range), by configuring an initialization value and maximum and minimum values of integrated displacement of the position detecting means, the movable end of the operating unit is allowed to agree with the movable end of the control target.

The value of a storage area storing the position generating output in the position generating step herein is assumed to be an initialization value from the position detecting step, and after the initialization assuming, the value of the storage area is integrated based on the signal from the position detecting step.

Furthermore, on the basis of the value of the storage area in the position generating step, when the integrated value is detected to be smaller or larger than the limited movable range of the operation unit, the minimum value or the maximum value of the integrated output is renewed corresponding to the movable range.

Thereby, positions of members of the optical system in the image-capturing apparatus, such as the zoom lens, the focus lens, and the iris, are controlled.

According to the embodiment, in the operating ring with a physically limited rotational angle, using a displacement sensor for detecting a relative displacement, such as an MR encoder and a pulse encoder, a ring easy to be intuitively operated with a limited rotational angle can be configured. When a user rotates the ring to the movable end, continuous control is possible by allowing the movable end of the ring to agree with the movable end of the control target without discontinuous operation of the control target.

Thus, according to the embodiment, with the ring with controlled variables easy to be intuitively recognized because of a limited rotational angle, a lens can be manually operated finely and smoothly. Moreover, even when the ring is rotated during the image-capturing apparatus is de-energized, on start up, the rotating angle of the ring can be detected by allowing the movable end of the ring to agree with movable end of the control target.

DESCRIPTION OF THE PREFERRED EMBODIMENTS

Embodiments of the present invention will be described below with reference to the drawings appropriately.

Figure 1:
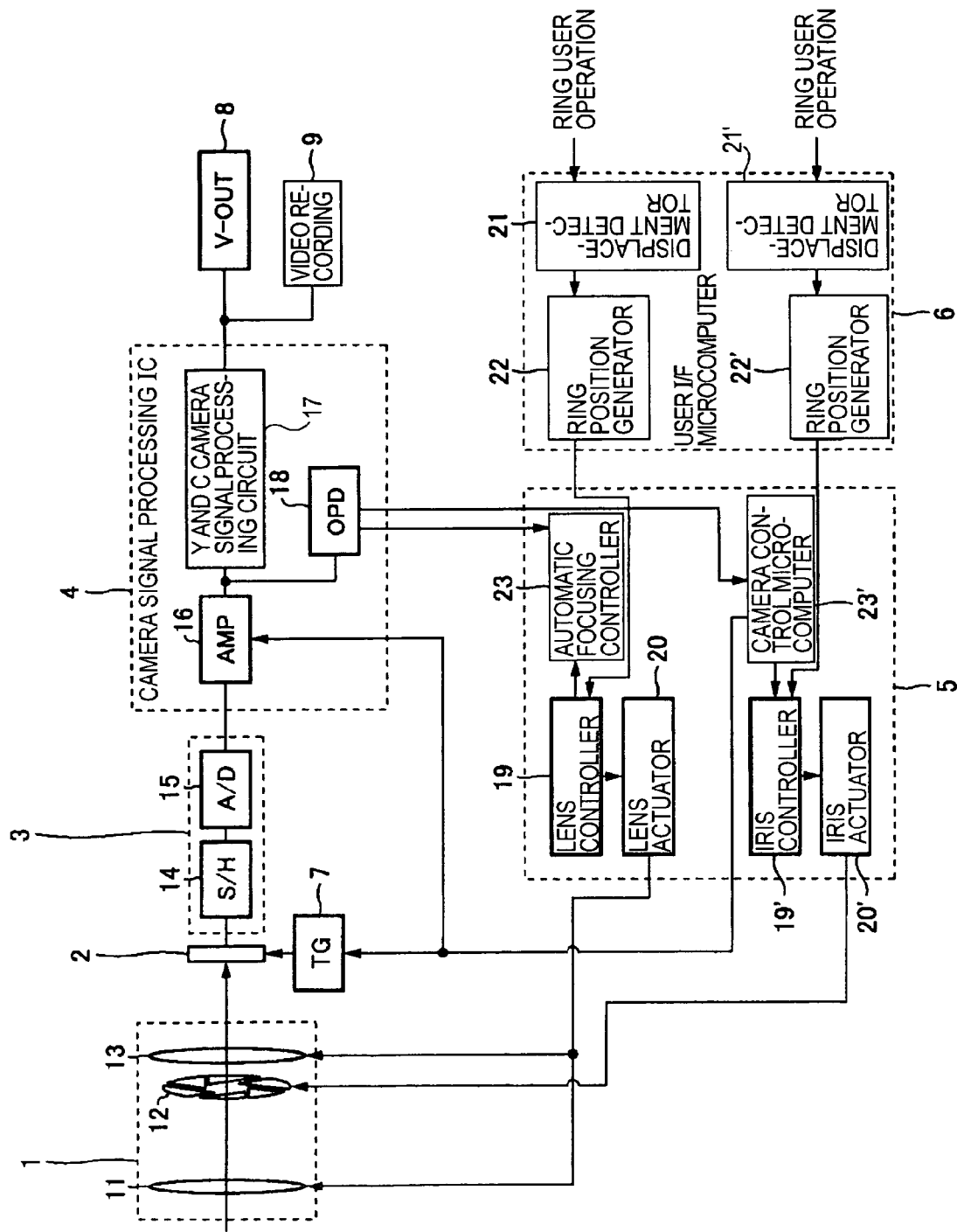
FIG. 1 is a block diagram of an image-capturing apparatus according to an embodiment.

FIG. 1 is a block diagram of an image-capturing apparatus according to an embodiment, showing the outline of the image-capturing apparatus.

Referring to FIG. 1, an image-capturing lens/iris block 1 enables an iris 12 to be exposed to an object lens, and enables a focus lens 13 to be focused. The image-capturing lens/iris block 1 also includes a lens casing for accommodating a zoom lens 11 therein.

An image-capturing element 2 is arranged in an optical axial direction of the image-capturing lens/iris block 1, and an image signal photo-electrically converted by the image-capturing element 2 is converted into digital image data by an A/D converter 15 after being sample-held at a predetermined timing by a S/H circuit 14 in a S/H-A/D block 3.

This digital image data is amplified by an amplifier circuit 16 in a camera signal processing block 4 to a level capable of signal-processing. The amplified digital image data is processed into luminous and chrominance signals by a luminous/chrominance signal processing circuit 17 so as to be outputted in an image-output unit 8 or a video-recording unit 9.

From the digital image data amplified to an level capable of signal-processing, a luminous signal level and a high-frequency component of the luminous signal are detected by a luminous-signal detector circuit 18, and exposure control is performed in accordance with this luminous signal level by an automatic exposure controller 23' in a camera control block 5; focusing control is performed in accordance with the high-frequency component of the luminous signal by the automatic focusing controller 23.

That is, based on an exposure control signal from the automatic exposure controller 23', exposure adjustment of the iris 12, photo-electric conversion timing from a timing generating circuit 7 to the image-capturing element 2, and an amplifier level of the amplifier circuit 16 are controlled, respectively.

Based on a focusing control signal from the automatic focusing controller 23, the position of the focus lens 13 is controlled by a lens controller 19 and a lens drive unit 20.

When the ring is operated by a user in a user interface control block 6, a predetermined relative displacement is detected from a displacement detector 21, as will be described later. The relative displacement output from the displacement detector 21 is supplied to a ring position generator 22, which produces a ring position output by configuring an initial value, and the maximum and minimum values of integrated displacement values from the relative displacement output.

This ring position output is supplied to the lens controller 19 in the camera control block 5, which produces a lens control signal based on the ring position output. This lens control signal is fed to the lens drive unit 20, which drives the focus lens 13 and the zoom lens 11 corresponding to the lens control signal.

Figure 2:
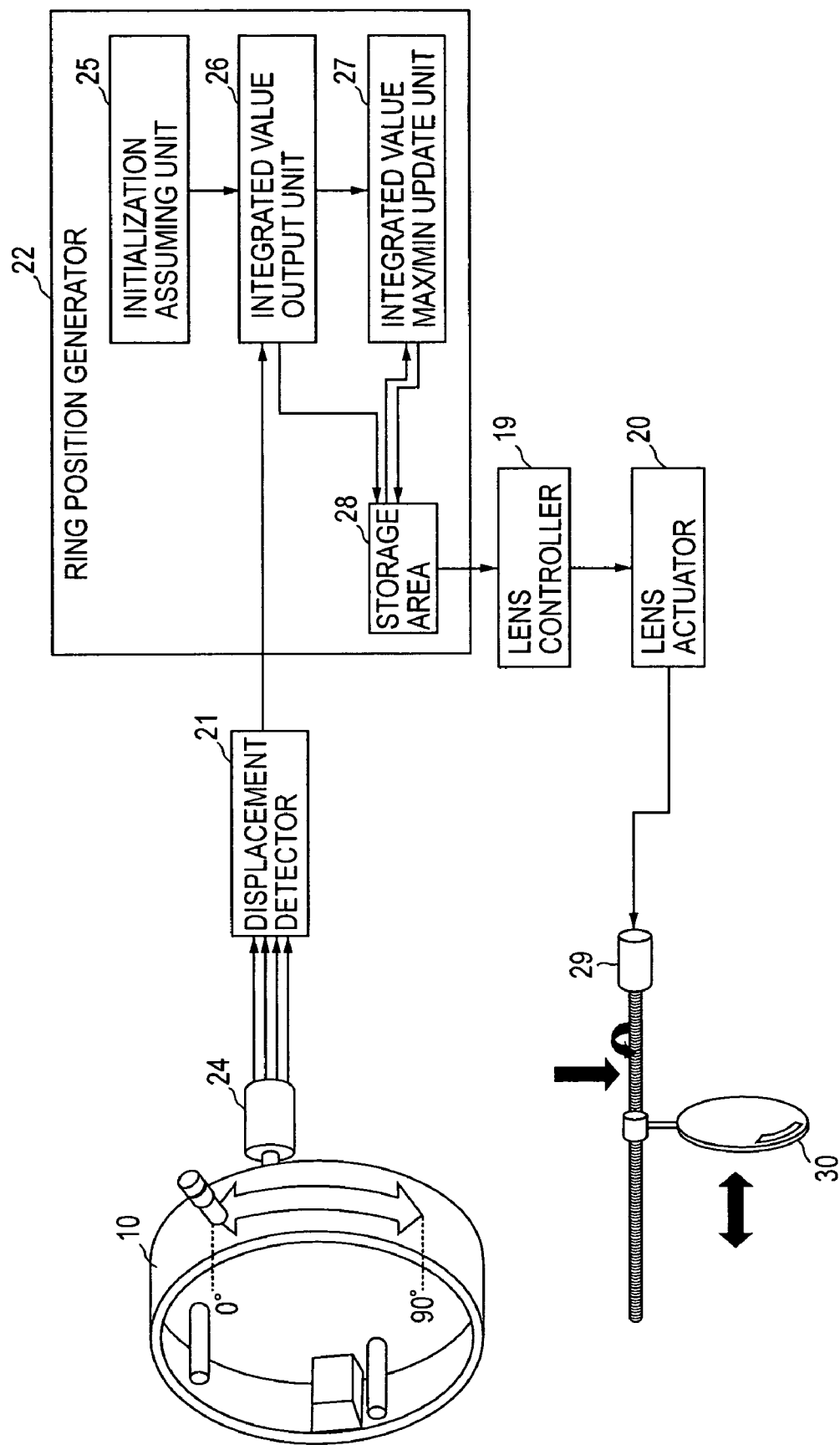
FIG. 2 is a drawing of the lens driving by a unit for generating a ring rotating position.

FIG. 2 is a drawing of the lens driving by the ring rotational position generating unit, showing a lens drive system with the operating ring.

Referring to FIG. 2, the rotational angle of the ring 10 is limited within a movable range of approximately 0° to 90°.

The upper end of the ring is assumed to 0° and the lower end 90°, for the sake of convenience in description. When the ring 10 is rotated by a user operation, the rotating shaft of a rotary MR encoder 24 is rotated via a gear following the ring 10.

Figure 3:
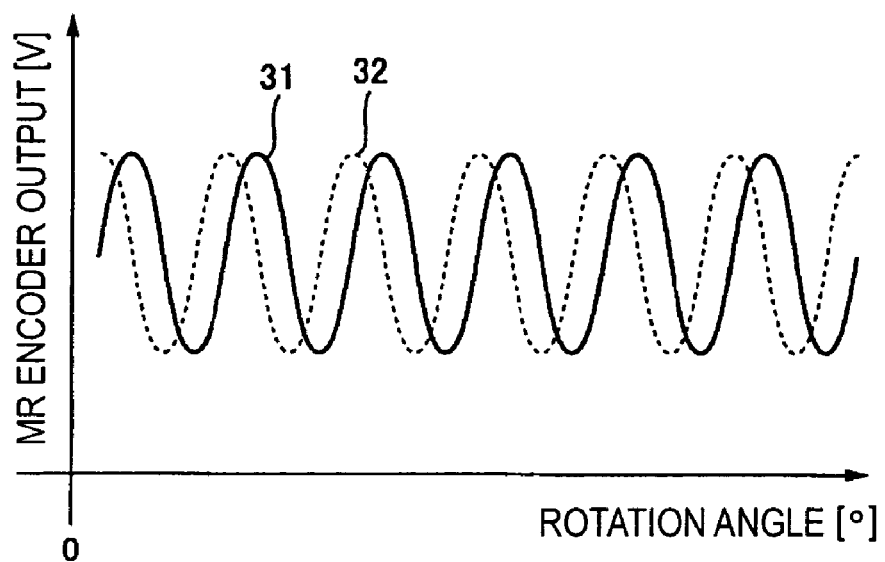
FIG. 3 is a drawing of the output of an MR encoder.

The output of the MR encoder 24 is processed in the displacement detector 21. Since the output of the MR encoder 24 is produced in a form of two-phase sine waves 31 and 32 (FIG. 3), the displacement detector 21 detects the displacement and the displacing direction from the voltage output with the continuous linear line segments in relation to the angle, based on the each phase voltage outputs and the phase relationship. Because changes in the output of the MR encoder 24 are increased even by the slight rotation of the ring 10, the displacement detector 21 can detect the magnitude of the rotation with high resolution.

If the encoder displacement detected by the displacement detector 21 is denoted by $\Delta R$; and the ring displacement by $\Delta \theta$, the relationship between both the values is given by Numerical Formula 1.

$$\Delta \theta = \Delta R \times \alpha, \quad \text{(Numerical Formula 1)}$$

where $\alpha$ is a constant; $\Delta \theta$ is the output of the displacement detector 21.

The operation of the lens drive configured as described above will be described below.

Figure 5:
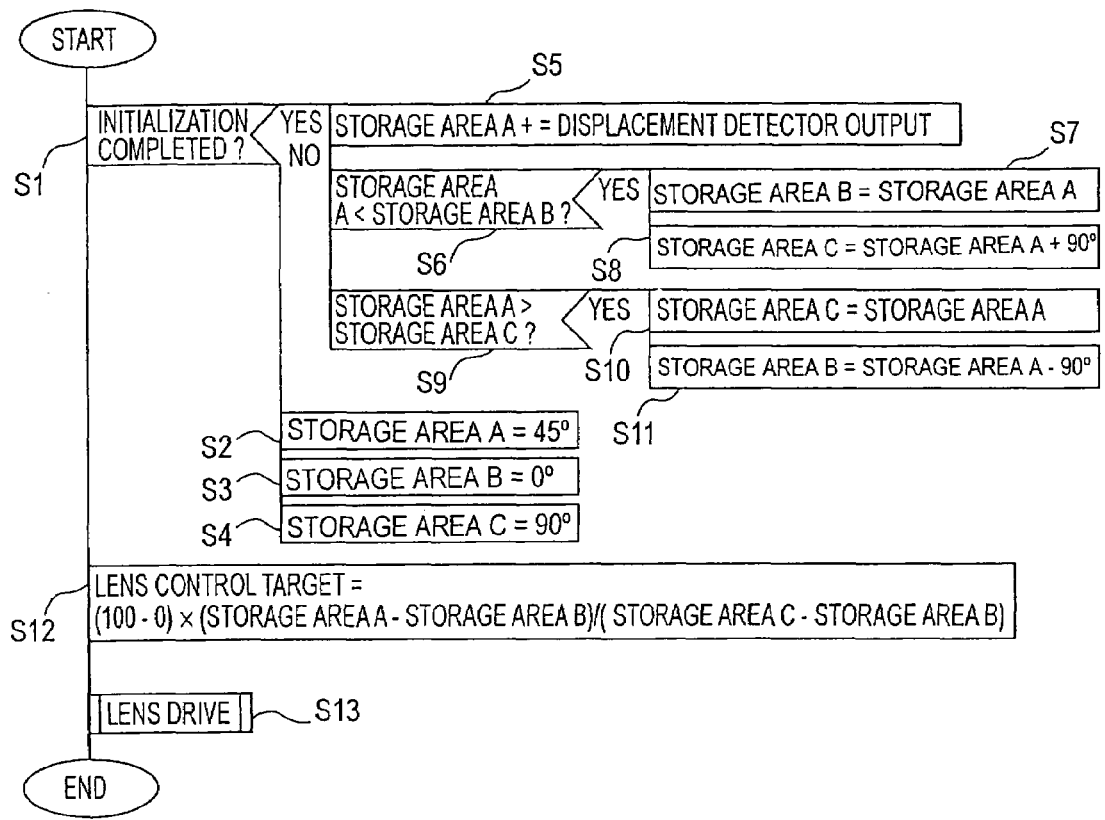
FIG. 5 is a PAD (problem analysis diagram) showing the operation of the lens drive.

FIG. 5 is a PAD (problem analysis diagram) of the operation of the lens drive, showing the operation of microcomputers in the user interface control block 6 and the camera control block 5.

Referring to FIG. 5, the initialization is first determined whether it is completed or not (Step S1). When the initialization is not completed at Step S1, storage area A denoted by numeral 28 is initialized (Step S2) with regarding the predetermined output (45°, for example) from the displacement detector 21 as the initial value; 0° is stored in storage area B denoted by numeral 28 (Step S3); and 90° is stored in storage area C denoted by numeral 28 (Step S4) so as to complete the initialization (Step S1). Specifically, when the value corresponding to the rotational angle of the ring 10 is generated in the ring position generator 22, storage area A denoted by numeral 28 exists in the ring position generator 22, so that the integrated value of displacement corresponding to the rotational angle of the ring 10 is stored. In a case where storage area A denoted by numeral 28 is not fixed, for example, right after power activation, an initialization assuming unit 25 of the ring position generator 22 regards the predetermined value (between 0° and 90°, 45°, for example) detected in the displacement detector 21 as the initial value so as to initialize storage area A denoted by numeral 28 with this rotational angle; 0° is stored in storage area B denoted by numeral 28; and 90° is stored in storage area C denoted by numeral 28.

When the initialization is completed at Step S1, the output of the displacement detector is added to the ring position regarded as the initial value in storage area A denoted by numeral 28 (Step S5). Specifically, the rotational angle regarded as the initial value in the initialization assuming unit 25 of the ring position generator 22 at Step S2 is assumed to be 45°, for example. Because the physical angle of the ring is not known at this time, the value of storage area A does not agree with the practical physical angle of the ring 10. However, the displacement of storage area A denoted by numeral 28 is adjusted by the above-mentioned α so as to become 90° at both ends. When the initialization is completed at Step S1, the rotational angle of the ring 10 from this point is calculated using the output of the displacement detector 21. For example, when the ring 10 is rotated by 0.5°, the displacement detector 21 produces a rotational angle of 0.5°, so that an integrated value output unit 26 of the ring position generator 22 adds 0.5° to 45° of storage area A denoted by numeral 28 so as to output an integrated value of 45.5°. Similarly hereinafter, the integrated value output unit 26 of the ring position generator 22 generates the ring position by adding the output of the displacement detector 21 to the value of storage area A denoted by numeral 28.

As described above, since the practical physical angle of the ring 10 does not agree with the value of storage area A denoted by numeral 28, storage area A denoted by numeral 28 may have a value beyond the range of 0° to 90°. Thus, using storage areas B and C denoted by numeral 28 in the ring position generator 22, the following processes are performed.

At Step S3, the upper end angle is stored in storage area B denoted by numeral 28; and at Step S4, the lower end angle is stored in storage area C denoted by numeral 28. In an initial state, storage area B=0°; and storage area C=90°.

If the value of storage area A denoted by numeral 28 becomes smaller than the value of storage area B denoted by numeral 28 (Step S6), it is regarded that the value of storage area B denoted by numeral 28=the value of storage area A denoted by numeral 28 (Step S7), so that the value is renewed by regarding that the value of storage area C denoted by numeral 28=the value of storage area A denoted by numeral 28+90° (Step S8). Specifically, when the value of storage area A denoted by numeral 28 becomes smaller than 0° beyond the range 0° to 90, an integrated value max/min update unit 27 of the ring position generator 22 renews the value so as to regard 0° as the minimum value and regard 90° as the maximum value of storage area A respectively.

If the value of storage area A denoted by numeral 28 becomes larger than the value of storage area C denoted by numeral 28 (Step S9), it is regarded that the value of storage area C denoted by numeral 28=the value of storage area A denoted by numeral 28 (Step S10), so that the value is renewed by regarding that the value of storage area B denoted by numeral 28=the value of storage area A−90° (Step S11). Specifically, when the value of storage area A denoted by numeral 28 becomes larger than 90° beyond the range 0° to 90°, the integrated value max/min update unit 27 of the ring position generator 22 renews the value so as to regard 90° as the maximum value and regard 0° as the minimum value of storage area A respectively.

By performing this process, when the ring 10 is rotated to the movable end, the ring 10 can agree with the movable end of the control target (lens).

Figure 6:
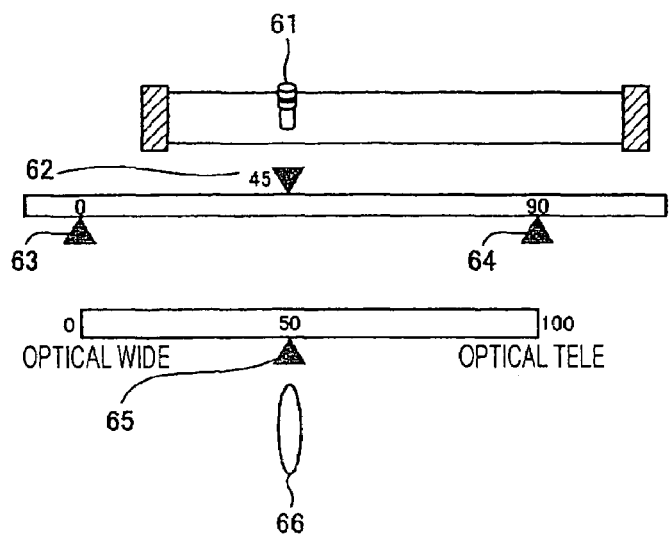
FIG. 6 is a drawing of an initial state.

FIG. 6 is a drawing showing the initial state.

In the initial state of FIG. 6, the value, which is within the range 0° to 90°, 45° for example, of storage area A denoted by numeral 62 corresponding to a ring physical position 61 is regarded as an initialization value so as to initialize storage area A, so that 0° is stored in storage area B denoted by numeral 63; and 90° is stored in storage area C denoted by numeral 64. At this time, a lens position 65 of a lens 66 is located at an intermediate position 50 between an optical wide end 0 and an optical telescopic end 100, corresponding to 45° between 0° and 90°.

Figure 7:
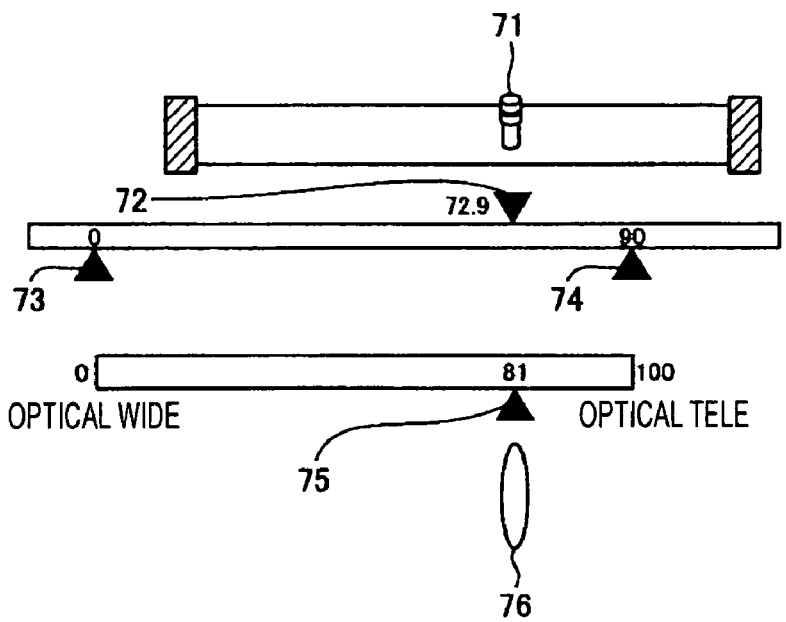
FIG. 7 is a drawing of a state that the lens is moved in accordance with the rotation of the ring.

FIG. 7 is a drawing showing a state that the lens is moved in accordance with the rotation of the ring.

Referring to FIG. 7, when the ring is rotated, the value corresponding to a ring physical position 71 is added to 45° of storage area A denoted by numeral 72 so that the value 72.9° is stored. At this time, a lens position 75 of a lens 76 is located at an intermediate position 81 between the optical wide end 0 and the optical telescopic end 100, corresponding to 72.9° between 0° of storage area B denoted by numeral 73 and 90° of storage area C denoted by numeral 74.

Figure 8:
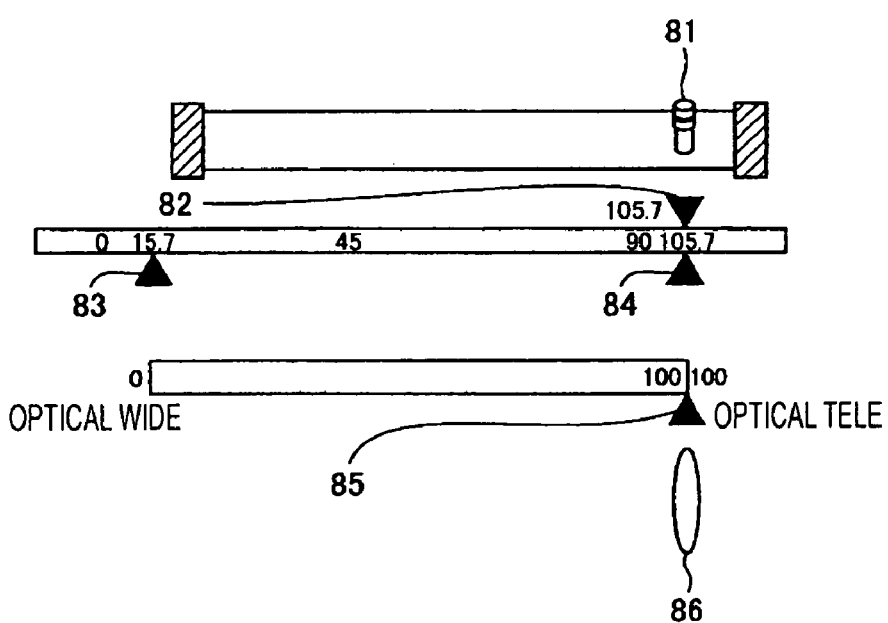
FIG. 8 is a drawing of a state that the value of storage area A becomes beyond 90.

FIG. 8 is a drawing showing a state that the value of storage area A becomes beyond 90°.

Referring to FIG. 8, when the ring is rotated toward the lower end so that the value of storage area A denoted by numeral 82 corresponding to a ring physical position 81 becomes a value of 105.7° larger than 90° beyond the range of 0° to 90°, a lens position 85 of a lens 86 is located at the optical telescopic end 100, corresponding to 105.7° larger than 90° beyond the range of 0° to 90°. At this time, the value is renewed so as to regard 90° as the maximum value of storage area C as denoted by numeral 84 and regard 0° as the minimum value of storage area A as denoted by numeral 83.

Although not shown, when the value of storage area A is reduced smaller than 0°, since the state becomes reverse to that of FIG. 8, the value is renewed so as to be reversed to FIG. 8.

In such a manner, by repeating the renewal of the maximum and minimum values of storage area A, the physical angle of the ring agrees with the value of storage area A, so that the movable end of the ring agrees with movable end of the lens.

Figure 9:
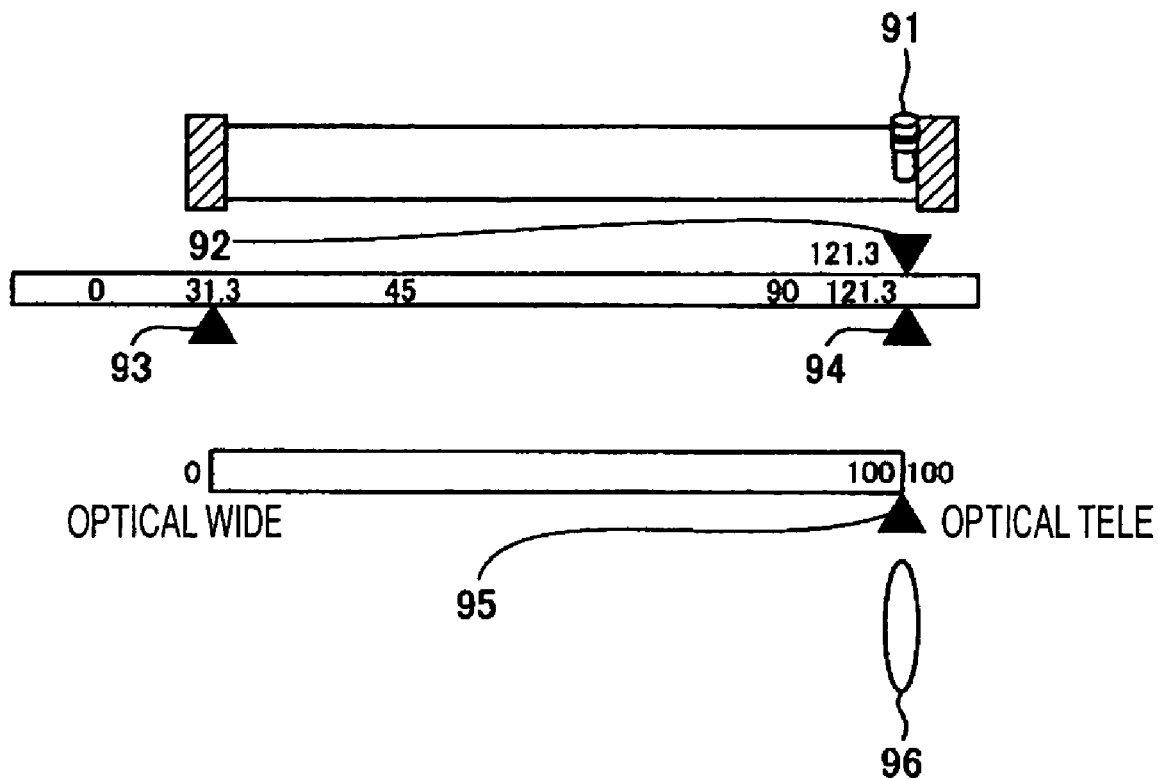
FIG. 9 is a drawing of a state that the movable end of the ring agrees with movable end of the lens.

FIG. 9 is a drawing of a state that the movable end of the ring agrees with movable end of the lens.

Referring to FIG. 9, when the ring is rotated to the lowermost end and the value of storage area A denoted by numeral 92 corresponding to a ring physical position 91 becomes the maximum 121.3° larger than 90° beyond the range of 0° to 90°, a lens position 95 of a lens 96 is located at the optical telescopic end 100, corresponding to 121.3° larger than 90° beyond the range of 0° to 90°. At this time, the value is renewed so as to regard 90° as the maximum value and regard 0° as the minimum value of storage area A respectively.

The lens controller 19 produces a control value (Step S12) based on values of storage areas A, B, and C in the ring position generator 22; the lens drive unit 20 moves the lens to the corresponding position (Step S13). When one position of the lens movable end corresponds to value 0 and the other position corresponds to value 100 for the sake of convenience in description, the lens position L (0≦L≦100) is given by Numerical Formula 2.

$$L=(100-0)\times(\text{the value of storage area } A-\text{the value of storage area } B)/(\text{the value of storage area } C-\text{the value of storage area } B) \quad \text{(Numerical Formula 2)}$$

In a zoom lens, for example, it is assumed that the wide end corresponds to value 0 and the telescopic end corresponds to value 100, alternatively, that the wide end corresponds to value 100 and the telescopic end corresponds to value 0. In a focus lens, it is assumed that the far end corresponds to value 0 and the near end corresponds to value 100, alternatively, that the far end corresponds to value 100 and the near end corresponds to value 0. Providing a selecting unit for selecting these alternative correspondences enables the relationship between the rotational direction of the ring 10 and the movement direction of the lens 30 to be selected by user's preference.

Moreover, the ring position generator 22 may monitor the output of the displacement detector 21 so as to detect whether the value of displacement discontinuously skips or not, and the value may be determined to skip when the displacement becomes discontinuous.

When the displacement becomes discontinuous, the initialization processing is again performed, and the ring position generator 22 completes the initialization at Step S1 by configuring the rotational angle detected by the displacement detector 21 at Step S2 as the initial position.

In addition, if the displacement does not become discontinuous, the lens drive at Step S13 is continued.

The ring position generator 22 according to the embodiment is not limited to the lens drive control described above; alternatively, it may be applied to the control of iris drive unit 20' which will be described later.

In this case, only the lens controller 19 and the lens drive unit 20, which are shown in FIG. 2, are replaced to an iris controller 19' and an iris drive unit 20', respectively; a lens drive motor 29 and the lens 30 are also replaced to an iris drive motor and an iris, respectively, and the other configurations may be the same. However, in the lenses shown in FIG. 1, the control signal supplied to the lens controller 19 from the automatic focusing controller 23 is replaced to the control signal supplied to an iris controller 19' from the automatic exposure controller 23' for the iris drive 20'.

The operation of the iris drive mentioned above will be described.

The iris controller 19' produces a control value based on the ring position outputted from the above-mentioned ring position generator 22'; the iris drive unit 20' moves the iris to the corresponding open/close position. Supposing that one open/close position of the iris movable end corresponds to value 0 and the other open/close position corresponds to value 100, for the sake of convenience in description, the iris open/close position L (0≦L≦100) is given by Numerical Formula 2 mentioned above. In this case, the control target is only replaced from the lens to the iris and the calculation and the control method are the same as those shown in FIG. 2 and a displacement detector 21' performs in the manner described with respect to the displacement detector 21.

Figure 10:
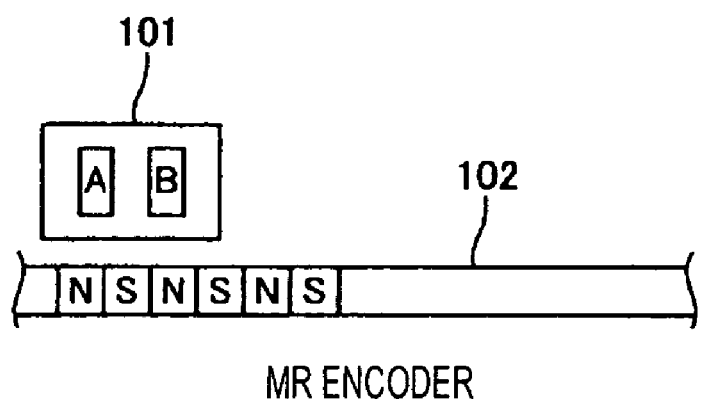
FIG. 10 is a drawing of the MR encoder and a potentiometer.

FIG. 10 is a drawing of the MR encoder.

When a detection subject polarized to an MR detection element 101 moves, the MR encoder shown in FIG. 10 detects changes in position of the detection subject by the resistance changes due to the magneto resistance effect of the MR detection element 101.

The sensor is not limited to the above-mentioned MR encoder and other sensors may also be used.

Figure 4:
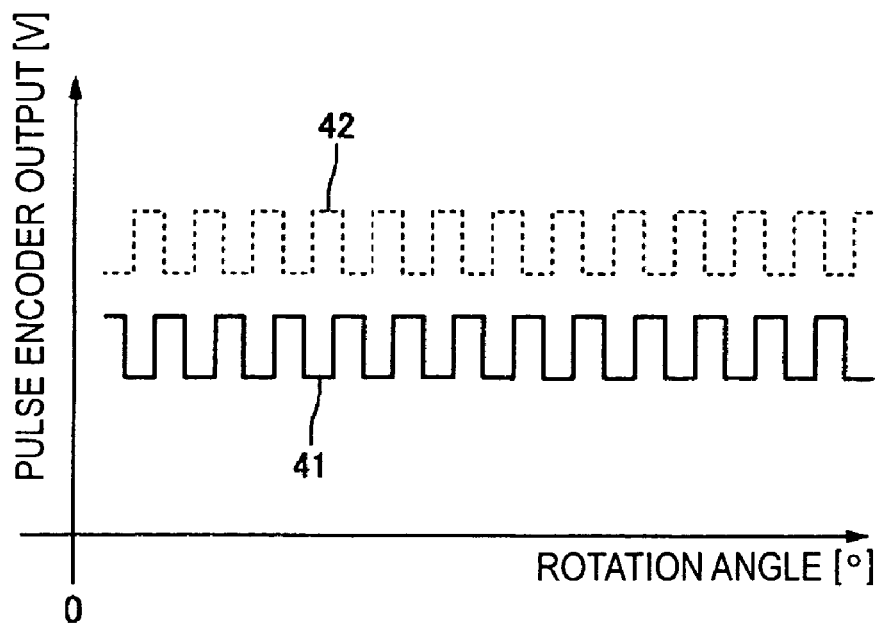
FIG. 4 is a drawing of the output of a pulse encoder.

For example, as a modification, a pulse encoder having two-phase pulse outputs 41 and 42 shown in FIG. 4 may also be used instead of the MR sensor as a displacement sensor.

Control examples of the lens drive system and the iris drive system have been described above; however, the control is not limited to those systems and other control targets driven by motors may be obviously applied.

The control may be widely incorporated to not only the rotating drive but also other operations linearly driven by a linear stepping motor. In this case, a liner encoder may be used instead of the rotary encoder by incorporating a mechanism for converting the ring rotation into linear movement.

The drive target may be applied to other optical members other than the lens.

It should be understood by those skilled in the art that various modifications, combinations, sub-combinations and alterations may occur depending on design requirements and other factors insofar as they are within the scope of the appended claims or the equivalents thereof.

What is claimed is:

1. A camera comprising:
   a control target configured to move along a path, a moveable range of said control target being between a minimum position and a maximum position;
   a displacement detector configured to detect a displacement of an actuator, said control target being movable along said path to a target position by an amount of said displacement;
   a storage area configured to store a predetermined minimum value of said minimum position and a predetermined maximum value of said maximum position, wherein a value of said minimum position is decreased to a renewed minimum value when a value of said target position becomes smaller than said predetermined minimum value, wherein a value of said maximum position is increased to a renewed maximum value when said value of said target position becomes larger than said predetermined maximum value.

2. The apparatus according to claim 1, wherein said value of said target position becomes said renewed minimum value.

3. The apparatus according to claim 1, wherein said value of said target position becomes said renewed maximum value.

4. The apparatus according to claim 1, wherein said value of said maximum position is decreased to said renewed maximum value by a difference between said predetermined and said renewed minimum values when said value of said target position becomes smaller than said predetermined minimum value.

5. The apparatus according to claim 1, wherein said value of said minimum position is increased said renewed minimum value by a difference between said predetermined and said renewed maximum values when said value of said target position becomes larger than said predetermined maximum value.

6. The apparatus according to claim 1, wherein said control target is a lens.

7. The apparatus according to claim 1, wherein said displacement is a rotation of said actuator.

8. The apparatus according to claim 1, wherein said displacement detector detects a displacing direction of said actuator.

9. The apparatus according to claim 1, wherein said displacement detector detects a magnitude of said displacement.

10. The apparatus according to claim 1, wherein said actuator is a ring, said ring being movable from one position to another position.

11. The apparatus according to claim 1, wherein said actuator is user operable.

12. The apparatus according to claim 1, wherein said path is an optical axis.

13. The apparatus according to claim 12, further comprising:

an image-capturing element arranged along said optical axis.

14. The apparatus according to claim 1, wherein said value of said target position represents a location of said target position along said path.

15. The apparatus according to claim 1, wherein said value of said maximum position represents a location along said path.

16. The apparatus according to claim 15, wherein said value of said minimum position represents another location along said path.

17. A driving method for driving an optical system in a camera, the method comprising the steps of:

initializing a value of a minimum position to a predetermined minimum value;

initializing a value of a maximum position to a predetermined maximum value;

initializing a target position to a predetermined target value, said target position representing a location along said path of a control target;

detecting a displacement of an actuator;

moving said control target along said path, said target position being varied by an amount of said displacement;

decreasing said value of said minimum position to a renewed minimum value when a value of said target position becomes smaller than said predetermined minimum value;

increasing said value of said maximum position to a renewed maximum value when a value of said target position becomes larger than said predetermined maximum value.

18. The method according to claim 17, wherein said value of said target position becomes said renewed minimum value.

19. The method according to claim 17, wherein said value of said target position becomes said renewed maximum value.

20. The method according to claim 17, wherein said value of said maximum position is decreased to said renewed maximum value by a difference between said predetermined and said renewed minimum values when said value of said target position becomes smaller than said predetermined minimum value.

21. The method according to claim 17, wherein said value of said minimum position is increased said renewed minimum value by a difference between said predetermined and said renewed maximum values when said value of said target position becomes larger than said predetermined maximum value.

22. The method according to claim 17, wherein a moveable range of said control target is between said minimum position and said maximum position.

23. The method according to claim 17, wherein said path is an optical axis.

24. The method according to claim 17, wherein said value of said target position represents a location of said target position along said path.

25. The method according to claim 17, wherein said value of said minimum position represents a location along said path.

26. The method according to claim 25, wherein said value of said maximum position represents another location along said path.

* * * * *